United States Patent [19]
Blackwell et al.

[11] Patent Number: 4,969,144
[45] Date of Patent: Nov. 6, 1990

[54] ADAPTIVE PASSBAND ECHO CANCELLER

[75] Inventors: Steven R. Blackwell, Huntsville; Steven E. Turner, Madison; Michael D. Turner, Madison; Jerry D. Moore, Huntsville, all of Ala.

[73] Assignee: Universal Data Systems, Inc., Huntsville, Ala.

[21] Appl. No.: 292,848

[22] Filed: Jan. 3, 1989

[51] Int. Cl.$^5$ ............................................. H04B 3/23
[52] U.S. Cl. ...................................... 370/32.1; 379/411
[58] Field of Search .................. 370/32, 32.1; 379/406, 379/408, 410, 411

[56] References Cited

U.S. PATENT DOCUMENTS

| Re. 31,253 | 5/1983 | Weinstein | 370/32.1 |
| 3,508,017 | 4/1970 | Unrue | 379/410 |
| 4,087,654 | 5/1978 | Mueller | 379/411 |
| 4,355,214 | 10/1982 | Levy et al. | 370/32 |
| 4,464,545 | 8/1984 | Werner | 370/32.1 |
| 4,578,543 | 3/1986 | LeBourlot et al. | 379/410 |
| 4,615,025 | 9/1986 | Vry | 370/32.1 |
| 4,682,358 | 7/1987 | Werner | 370/32.1 |
| 4,769,808 | 9/1988 | Kanemasa et al. | 370/32.1 |

FOREIGN PATENT DOCUMENTS 574282 6/1988 Australia ........................... 370/32.1

*Primary Examiner*—Jin F. Ng
*Assistant Examiner*—Randall P. Myers
*Attorney, Agent, or Firm*—Charles L. Warren

[57] ABSTRACT

A passband echo canceller achieves improved performance by providing a signal having a substantially uniform power spectral density to an adaptive echo canceller; the improved input signal is substantially uniform from approximately zero hertz to one half the operating or sample frequency of the echo canceller. This signal may comprise that range of frequencies occupied by the transmitted spectrum with added out of band noise.

15 Claims, 3 Drawing Sheets

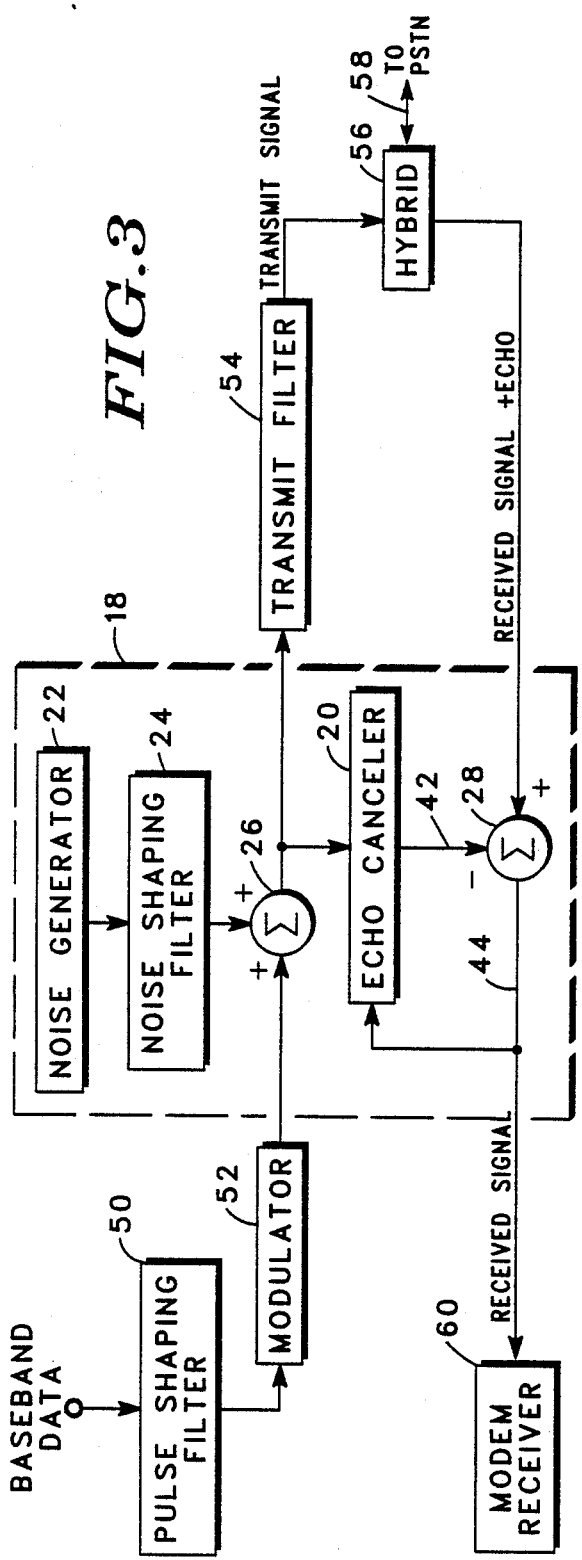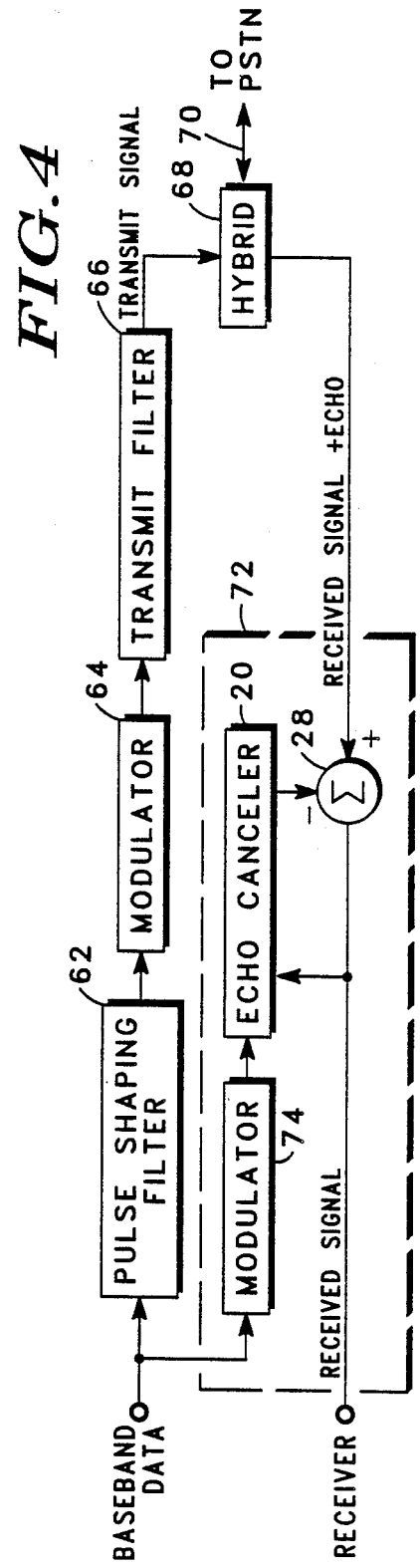

ADAPTIVE PASSBAND ECHO CANCELLER

BACKGROUND OF THE INVENTION

This invention is generally directed to the cancellation of undesired echos on a two-way communications channel and is more specifically directed to an adaptive echo canceller which operates at passband frequencies. Passband refers to signals centered about a frequency other than zero hertz. Passband is normally contrasted with baseband in which signals are centered about or begin at zero hertz.

This invention is especially, but not exclusively, suited for use with modems which operate full duplex over a single transmission channel. In order to achieve reliable high speed data transmission it is necessary to cancel the echo of the local modem's transmitted signal from the received signal. Echo cancellers operating at baseband have been successfully used in modems. However, the digital implementation of a baseband echo canceller requires the use of complex arithmetic, i.e. calculations utilizing real and imaginary terms. Since the output of conventional modems is at passband, the baseband echo canceller must be located internally within the modem and operate on baseband transmit and received signals. Adaptive baseband echo cancellers are disclosed in U.S. Pat. Nos. 4,087,654; 4,355,214; and Re. 31,253.

Passband echo cancellers have been successfully utilized in voice communications paths, such as in the public telephone network, where the amount of echo cancellation required is not as great as in digital data applications. For example, U.S. Pat. Nos. 3,508,017 and 4,578,543 address echo cancellation for voice circuits. Such circuits have been found acceptable where cancellation of 30 decibels (db) to 40 db are acceptable. However, conventional passband echo techniques have not been able to achieve the same degree of echo cancellation as baseband cancellers which can achieve cancellation on the order of 60 db.

U.S. Pat. No. 4,464,545 addresses a passband echo canceller for data signals. A pair of filters which have output signals as a function of the single input signal stream is utilized.

It is an object of the present invention to provide an improved adaptive passband echo canceller which can provide levels of cancellation comparable to baseband echo cancellers.

BRIEF DESCRIPTION OF THE DRAWINGS

FIG. 3 is a block diagram of an embodiment of a passband echo canceller according to the present invention used in a modem.

FIG. 4 is a block diagram of another embodiment of a passband echo canceller in accordance with the present invention used in a modem.

DESCRIPTION OF PREFERRED EMBODIMENTS

Before describing the embodiments of the present invention, it should be noted that an important aspect of the present invention resides in the analysis and discovery of the problem associated with conventional passband echo cancellers which prevented them from achieving cancellation performance substantially equivalent to baseband echo cancellers. The poor performance of prior art passband echo cancellers has been determined to be related to the spectral content of the signal presented to the echo canceller. Preferably the signal provided to the passband echo canceller is substantially flat across the frequency band from zero to one half the operating frequency (sampling rate) of the echo canceller. Providing the echo canceller with a signal having this spectral content allows the canceller to achieve a substantially higher level of cancellation as compared with an input signal which contains only the frequency range of signals transmitted by the modem.

Figure 1:
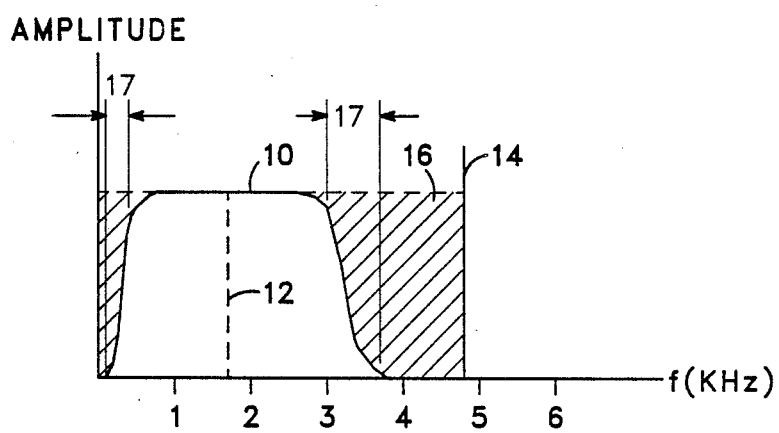
FIG. 1 is a graph illustrating a typical frequency response of a telephone channel with additional noise added outside the channel in accordance with the present invention.

FIG. 1 illustrates a frequency response characteristic 10 such as of a conventional telephone line. A center frequency indicated by line 12 is typically selected near the center of the bandwidth of the channel and serves as the carrier frequency about which the signals to be transmitted are modulated. In the illustrated example, line 14 indicates a frequency (4.8 khz) equal to one half of the sampling frequency (9.6 khz) of the echo canceller. The sampling frequency is defined as follows:

$$fs = N \times R$$

where fs is the sampling frequency, N is the number of samples per baud, and R is the baud rate. In the illustrated example, for N=4 and R=2.4 khz fs=9.6 khz. Thus according to the present invention, the preferred signal presented to a passband echo canceller should be substantially flat from zero to 4.8 khz. The shaded areas 16 represent the addition of additive white gaussian noise which has been added outside of channel 10 to define a composite signal which has a substantially uniform power spectral density between approximately zero hertz and fs/2 in accordance with the present invention. This composite signal comprises the input to a conventional passband echo canceller network and enchances the level of cancellation of such a network. Cancellation levels in excess of 60 db have been achieved with adaptive passband echo cancellers utilizing a composite signal in accordance with the present invention.

This invention also increases the speed of convergence of a passband echo canceller. In a Bell standard 208 modem the preferred signal according to the present invention allowed an echo canceller to achieve 45 db of cancellation in one tenth the time it took the echo canceller to attain the same level of cancellation without the use of this invention. The speed advantage increases at higher cancellation levels. Conventional passband echo cancellation methods converge so slowly at high levels of cancellation that they are not useful for high speed data applications.

The addition of out-of-band noise 16 does not interfere with the ability of the echo canceller to located and cancel echoes in the frequencies of interest, frequency range 10 since noise is not added to this range. It is generally believed that the addition of the out-of-band noise in the composite signal accomplishes the improved result by increasing the degrees of freedom available to the passband echo canceller.

Although the maximum advantages of the present invention are achieved by supplying a substantially uniform power spectral density input between approximately zero hertz and fs/2 to the passband echo canceller, substantial improvement can be gained by adding some signals. Out-of-band signals closest to the frequency range 10 have the biggest impact in cancellation improvement. Thus, adding out-of-band signals (energy) within the "skirts" or edges 17 of the frequency range 10 would provide an improvement in accord with this invention. For example, passband echo cancellation improvements in a signal defined by corner frequencies at 300 hertz and 3000 hertz can be attained by adding out-of-band signals in the skirts between 150–300 hertz and 3000–3600 hertz.

For most data communications applications, the preferred method of implementing the passband echo canceller will consist of using digital signal processing techniques. For purposes of clarity of explanation, analog to digital and digital to analog converters are not shown in the block diagrams in FIGS. 2–6.

Figure 2:
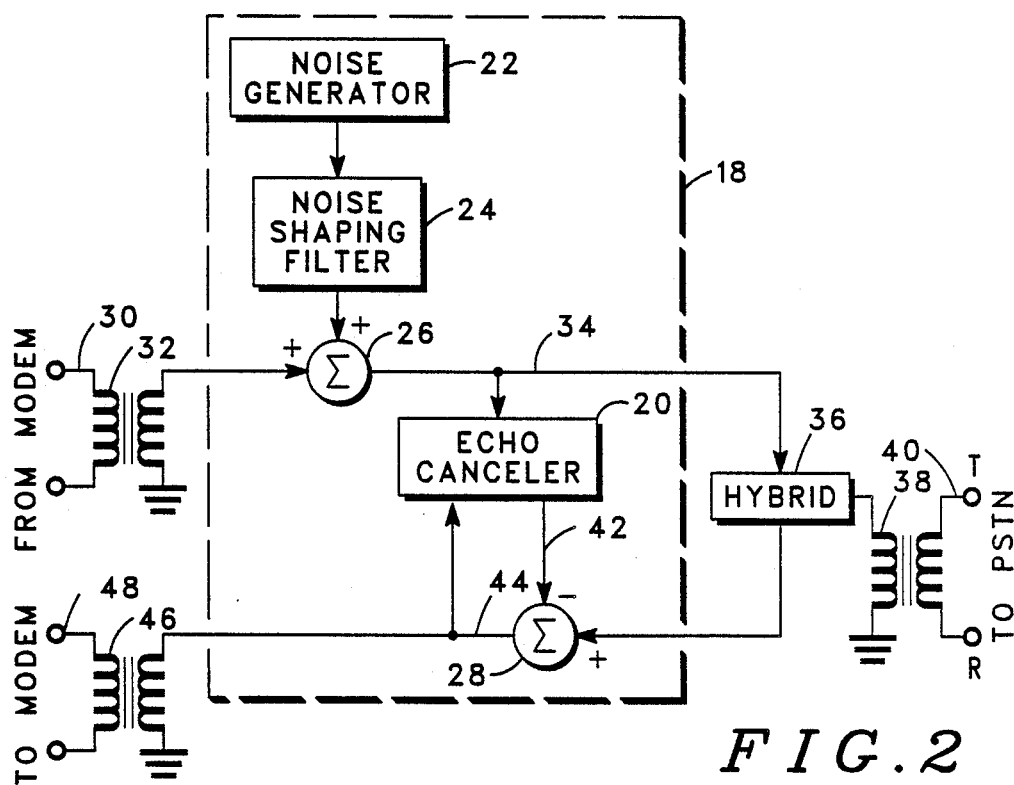
FIG. 2 is a schematic diagram showing an adaptive passband echo canceller in accordance with the present invention utilized to permit operation of a four wire modem over a two wire line.

FIG. 2 shows an embodiment 18 of an adaptive passband echo cancellation circuit in accordance with the present invention which includes a conventional echo canceller 20, noise generator 22, noise shaping filter 24 and summation networks 26 and 28. Incoming data such as from a modem transmitter may be coupled from channel 30 by transformer 32 to summation network 26. Noise generator 22 generates white gaussian noise over the spectrum of interest. The noise generator's output is shaped by noise shaping filter 24 to present only out-of-band noise in a desired frequency spectrum as an input to summation network 26. The output 34 of the summation network comprises an input to echo canceller 20 and is also coupled to hybrid 36. This signal is coupled by a transformer 38 to a two wire channel 40 which may be connected to the public switched telephone network (PSTN). Although out-of-band noise comprises part of signal 34, it does not have a substantial detrimental impact since hybrid 36, transformer 38, and channel 40 substantially attenuate the noise portion.

Incoming signals from channel 40 including echoes of the transmitted signals are coupled by transformer 38 and hybrid 36 to summation network 28. Output 42 of echo canceller 20 comprises the other input to summation network 28. The output 44 of network 28 is coupled as an error feedback signal to echo canceller 20 and is coupled to transformer 46 which couples the received signal following echo cancellation to channel 48. This channel may be connected to a receiver of a modem.

The structure and operation of an echo canceller 20, summation network 28 and the feedback signal 44 to the echo canceller is well-known in the art. U.S. Pat. Nos. 3,508,017 and 4,464,545 describe the operation and structure of such elements, and are incorporated herein by reference.

A means for providing the echo canceller 20 with a substantially flat power spectral density up to one half the sampling frequency is provided by noise generator 22 and noise filter 24 in combination with the input signal from transformer 32. The improved operation of the cancellation network 18 according to the present invention makes it feasible to connect high speed four wire modems, i.e. running at 4.8 Kbps or greater, over a two wire PSTN to each other. This eliminates the need for two dedicated wire pairs between modems. It further allows such modems normally operating over dedicated lines to be connected during emergency situations over the PSTN.

FIG. 3 illustrates the network 18 according to the present invention implemented within a modem. The network functions the same as described with respect to FIG. 2. Incoming baseband data is filtered by pulse shaping filter 50 prior to being received as an input by modulator 52. Modulator 52 modulates the incoming baseband data about a reference frequency located within the passband of the communications channel. The output of modulator 52 provides an input to summation network 26. This signal is summed with the filtered noise from noise filter 24 to provide an input to a transmit filter 54 and to echo canceller 20. The transmit filter 54 provides additional filtering to further attenuate undesired signal components outside the frequency allowed for the communications channel. This filtered output signal is coupled to a hybrid 56 which couples the transmitted information to the PSTN 58. Incoming data and echoes from PSTN 58 are coupled by hybrid 56 to summation network 28. The other input to summation network 28 comprises output 42 from echo canceller 20. Its output 44 which consists of the received signal following echo cancellation is supplied to a modem receiver 60.

FIGS. 2 and 3 illustrate embodiments of the present invention which demonstrate its independent use with four wire modems and its use internal to a modem to allow two wire operation. In the embodiment shown in FIG. 3, the echo canceller according to the present invention provides an alternative to a conventional baseband echo canceller implementation. However, it should be noted that in the embodiment shown in FIG. 2, a conventional baseband canceller could not be utilized since baseband information, i.e. information prior to modulation, is not available. Thus, the improved performance of the passband echo canceller according to the present invention is especially suited for use in an embodiment external to a modem such as shown in FIG. 2.

Figure 5:
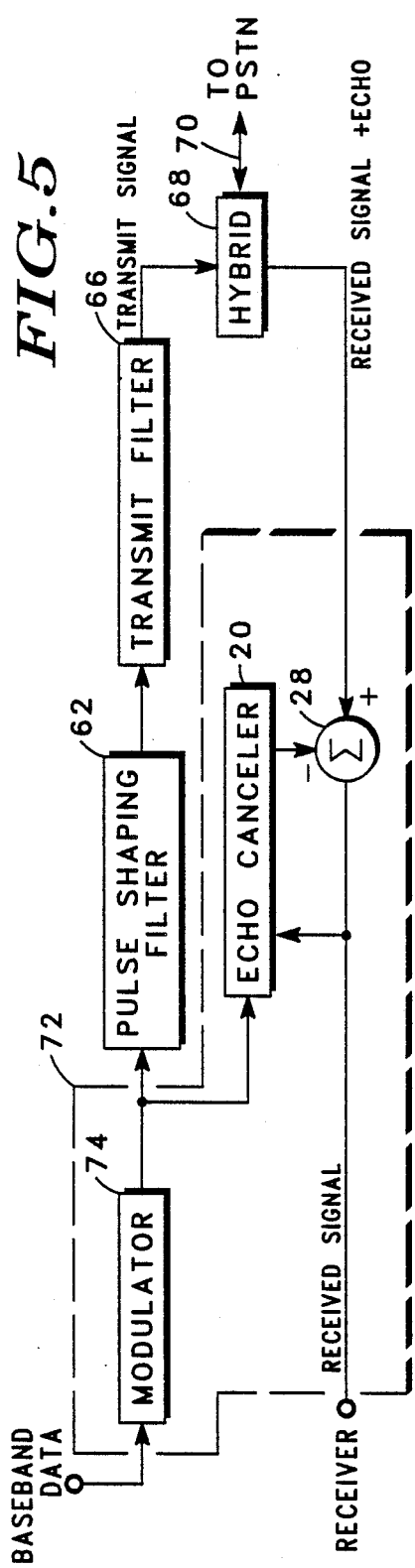
FIG. 5 is a block diagram illustrating a passband echo canceller according to the present invention used in a modem.

FIGS. 4 and 5 illustrate further embodiments of a passband echo canceller according to the present invention which are implemented internally within a modem. These two embodiments differ from the preceding embodiments in that the echo canceller is provided with a substantially constant power spectral density signal up to one half of the sampling frequency of the echo canceller without the use of a separate noise generator. These embodiments rely upon a specially adapted modulator which provides a substantially flat frequency response to one half of the sampling frequency. Conventional modulators used in modems do not provide such a response. Many conventional modulators are designed to provide only a limited frequency output to simplify the need for out of band filtering.

Referring to FIG. 4, a conventional modem transmitter receives incoming baseband data, utilizes a pulse shaping filter 62 to shape the spectrum of signal prior to using it as an input to modulator 64. This modulator may consist of a conventional digital implementation of a modulator in which the spectral response characteristics above the frequencies of interest to be transmitted by the modem are normally not accommodated. The modulated output is further filtered by transmit filter 66 before being coupled to hybrid 68 which couples the transmit signal to the PSTN 70.

In this implementation, passband echo canceller 72 includes a modulator 74 which is especially suited to provide a spectral response to one half of the sampling frequency. A specific implementation for such a modulator will be described in regard to FIG. 6. Because of the extended frequency output from modulator 74, echo canceller 20 receives a signal with a substantially constant power spectral density up to one half of the sampling frequency and thus eliminates the need to add additional out of band noise. The echo canceller 20 and the summation network 28 function as previously described in regard to prior embodiments.

FIG. 5 illustrates the passband echo canceller 72 in accordance with the present invention utilized in a slightly different configuration within a modem. In this embodiment, only a single modulator 74 having an extended frequency response is utilized instead of an additional modulator as was utilized in the embodiment shown in FIG. 4. In this embodiment, the wide bandwidth spectral output for modulator 74 is shaped by pulse shaping filter 62 and transmit filter 66 before being coupled to hybrid 68.

Although the embodiment shown in FIGS. 4 and 5 should theoretically achieve the same level of performance, it has been found that the implementation shown in FIG. 4 achieves slightly better performance. This is believed to be due to practical implementations associated with the embodiment shown in FIG. 5. For example, filters 62 and 66 have finite filtering capabilities to attenuate the wide frequency output presented from modulator 74. Thus a slightly lower level of performance is achieved as compared with the embodiment shown in FIG. 4.

Figure 6:
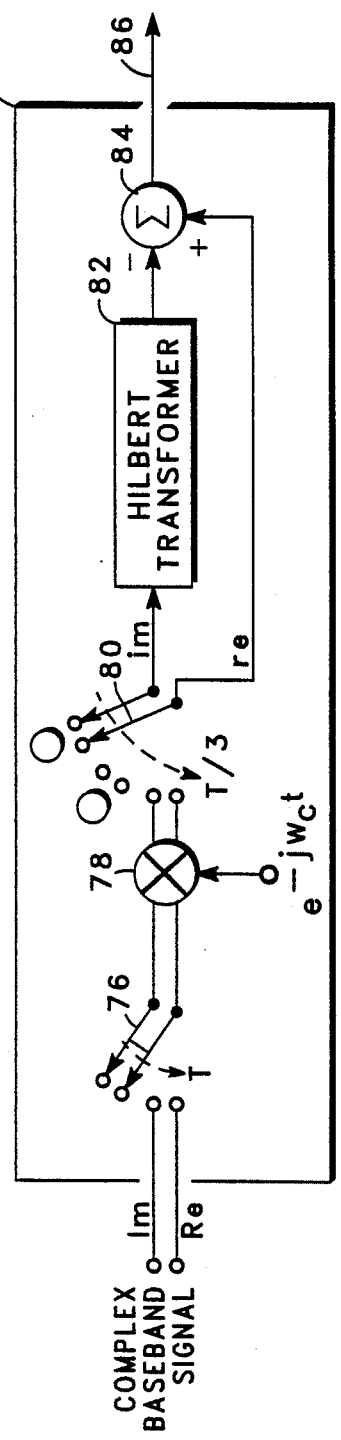
FIG. 6 is a schematic diagram showing an improved digital implementation of a modulator having a spectral output in accordance with the present invention.

FIG. 6 illustrates a digital implementation of a modulator 74 which provides an expanded output frequency spectrum that is substantially flat to one half of the sampling frequency. Complex baseband signals which consist of separate real and imaginary parts are sampled at a rate of T by sampler 76 which provides the samples to a multiplier 78. This multiplier multiplies the samples by a digital representation of a carrier frequency indicated as $e^{-jw_ct}$. The output of the multiplier is sampled at a T/3 rate by sampler 80 in which two of the samples constitute zero inputs with the third sample constituting the sampled signal from multiplier 78. The imaginary portion of each signal sample is fed to a Hilbert transformation circuit 82 which transforms the imaginary signal into a real signal which is coupled to summation network 84. The real portion of the signal sample is also coupled to summation network 84 with the resulting output 86 constituting a real passband signal having a frequency response from zero to fs/2. The summation of the Hilbert transformed imaginary portion with the real portion of the modulated sampled signal results in the cancellation of the frequency components from fs/2 to fs leaving only the frequency spectrum from 0 hertz to fs/2 at the output 86. This eliminates the need for additional filtering to attenuate the signals above fs/2.

For example, assume that the modulator 74 would be utilized with a V.32 modem which has a centered carrier frequency of 1800 hertz and utilizes a baud rate of 2400 hertz. The sampling rate T would equal 1/2400 and the carrier frequency would have a radian frequency equal to $2\pi \times 1800$. Such a V.32 signal would have the highest component of interest at approximately 3200 hertz. A sampling rate by sampler 80 is selected to be at a T/3 rate or 7200 hertz which makes fs/2=3600 hertz. The output 86 of the modulator 74 provides a real passband signal having a frequency spectrum from 0 to 3600 hertz which is provided to echo canceller 20 to achieve the improved performance according to the present invention.

Although the present invention has been described in terms of application to echo cancellation in a modem, it could also be applied to echo cancellation in a digital data service (DDS) two wire system in which echoes have to be cancelled in order to facilitate the maximum possible data rate transfer. It is believed that the same need to provide an echo canceller with a substantially flat spectral range to one half of the sampling frequency is still important to achieve a high level of cancellation.

Although embodiments of the present invention have been described above and shown in the drawings, the scope of the invention is defined by the claims which follow.

What is claimed is:

1. A data communications system comprising:
    transmitter for transmitting outbound data;
    receiver for receiving incoming data, said outbound and incoming data being carried on a single communications channel; and
    means for cancelling echoes of said outbound data at passband comprising:
        an adaptive echo canceller having an input for receiving a correlation signal which includes outbound data information contained in a predetermined frequency range and having an output that consists of a correction signal for substantially cancelling said echoes, said canceller operating at an operating frequency,
    means for generating said correlation signal such that it contains substantial energy outside of and contiguous with said frequency range
        said energy and outbound data information form a correlation signal having a substantially constant power spectral density from near zero hertz to one half of said operating frequency, and
    means for summing said received incoming data and said correction signal to substantially cancel said echoes.

2. The system according to claim 1 wherein said outbound data information occupies a frequency range less than one half of said operating frequency of said echo canceller, and wherein said generating means comprises means for generating a noise signal outside said frequency range such that the addition of said outbound data information and said noise signal defines said correlation signal.

3. The system according to claim 1 wherein said correlation signal generating means comprises means for modulating baseband data into passband data such that a continuous output spectrum is produced having a substantially constant power spectral density from zero hertz to one half of said certain frequency.

4. The system according to claim 3 wherein said modulating means produces a correlation signal that does not extend beyond one half of said operating frequency of the echo canceller.

5. The system according to claim 1 wherein said outbound data information occupies a frequency range less than one half of said operating frequency of said echo canceller, and wherein said generating means comprises means for generating a noise signal outside said frequency range such that the addition of said outbound data information and said noise signal defines said correlation signal.

6. The system according to claim 1 wherein said correlation signal generating means comprises means for modulating baseband data into passband data such that a continuous output spectrum is produced having a substantially constant power spectral density from zero hertz to one half of said operating frequency.

7. The system according to claim 6 wherein said modulating means produces a correlation signal that does not extend beyond one half of said operating frequency of the echo canceller.

8. A method for cancelling echoes at passband in a data communications system comprising the steps of:
   transmitting outbound data;
   receiving incoming data which includes echoes corresponding to said out outbound data;
   generating a correction signal which substantially cancels said echoes at passband by the use of an adaptive echo canceller operating at an operating frequency;
   generating a correlation signal which is received as an input by the echo canceller, said correlation signal including outbound data information contained in a predetermined frequency range and containing substantial energy outside of and contiguous with said frequency range
   said energy and outbound data information form a correlation signal having a substantially constant power spectral density from near zero hertz to one half of said operating frequency, and
   summing said incoming data and said correction signal to substantially cancel said echoes.

9. The method according to claim 8 wherein said step of generating said correlation signal comprises the step of adding to the outbound data information noise outside of the range of frequencies occupied by the outbound information.

10. The method according to claim 8 wherein the step of generating said correlation signal comprises the step of modulating the data to be transmitted as outbound data such that the correlation signal provided to the echo canceller comprises outbound data within said frequency range and signals having energy outside said frequency range.

11. The method according to claim 10 wherein said correlation signal has a substantially uniform power spectral density from near zero hertz to one half of said operating frequency of the echo canceller.

12. A passband echo cancellation system comprising:
   means for receiving a first signal on a first simplex channel, said first signal being within a first frequency range;
   means for transmitting a second signal on a second simplex channel;
   means for generating a third signal which includes said first signal and has energy outside of and contiguous with said first frequency range;
   a hybrid couples said third signal to a third duplex channel and couples a fourth signal from said third channel to a summation network;
   an echo canceller receives said third signal as its input and generates an echo replica signal which is coupled to said summation network, said canceller operating at a predetermined frequency; said summation network producing an output which defines said second signal;
   said third signal having a substantially constant power spectral density from near zero hertz to one half of said predetermined frequency.

13. The cancellation system according to claim 12 wherein said means for producing said third signal comprises another summation network having first and second inputs, said first input receiving said first signal, and means for generating noise outside of said first frequency range supplies a noise signal to said second input to produce a resulting output.

14. A passband echo cancellation method comprising the steps of:
   receiving a first signal on a first simplex channel, said first signal being within a first frequency range;
   transmitting a second signal on a second simplex channel;
   generating a third signal which includes said first signal and energy outside of and contiguous with said first frequency range;
   coupling said third signal to a third duplex channel and coupling a fourth signal from said third channel to a summation network;
   generating an echo replica signal based upon said third signal which is coupled to said summation network, said summation network producing an output which defines said second signal;
   said third signal having a substantially constant power spectral density from near zero hertz to one half of said first frequency range.

15. The method according to claim 14 wherein said step of generating said third signal comprises the steps of generating a noise signal outside of said first frequency range and adding said noise signal to said first signal.

* * * * *